United States Patent
Sakai et al.

(10) Patent No.: US 11,620,479 B2
(45) Date of Patent: Apr. 4, 2023

(54) SYSTEM FOR DETERMINING DIVERTING AVAILABILITY OF OBJECT RECOGNITION MODEL

(71) Applicant: Hitachi, Ltd., Tokyo (JP)

(72) Inventors: Ryo Sakai, Tokyo (JP); Nobutaka Kimura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 160 days.

(21) Appl. No.: 17/163,620

(22) Filed: Feb. 1, 2021

(65) Prior Publication Data

US 2021/0256317 A1 Aug. 19, 2021

(30) Foreign Application Priority Data

Feb. 17, 2020 (JP) .............................. JP2020-024476

(51) Int. Cl.
*G06K 9/62* (2022.01)
*G06T 7/20* (2017.01)

(52) U.S. Cl.
CPC ............. *G06K 9/6262* (2013.01); *G06T 7/20* (2013.01); *G06T 2207/10016* (2013.01); *G06T 2207/20081* (2013.01)

(58) Field of Classification Search
None
See application file for complete search history.

(56) References Cited

U.S. PATENT DOCUMENTS

| 5,706,419 A | 1/1998 | Matsugu et al. |
| 2012/0134532 A1* | 5/2012 | Ni ........................ G08G 1/0175 382/104 |
| 2019/0090786 A1* | 3/2019 | Kim ........................ G06N 3/08 |

FOREIGN PATENT DOCUMENTS

JP 08-233556 A 9/1996

OTHER PUBLICATIONS

A comprehensive hands on guide to transfer learning with real world applications in deep learning, by Sarkar, Nov. 14, 2008. Published in Towards Data Science (Year: 2018).*

* cited by examiner

*Primary Examiner* — Vikkram Bali
(74) *Attorney, Agent, or Firm* — Mattingly & Malur, PC

(57) ABSTRACT

To determine diverting availability of a trained recognition model of another object to a target object. A system includes one or more processors and one or more storage devices. The one or more storage devices store an image time series including a target object, and a trained object recognition model for one or more objects which are different from the target object. The one or more processors acquire a movement trajectory of the target object from a recognition result of the target object in the image time series by the object recognition model, and determine diverting availability of the object recognition model to the target object based on the movement trajectory of the target object.

7 Claims, 8 Drawing Sheets

SYSTEM FOR DETERMINING DIVERTING AVAILABILITY OF OBJECT RECOGNITION MODEL

CLAIM OF PRIORITY

The present application claims priority from Japanese patent application JP 2020-024476 filed on Feb. 17, 2020, the content of which is hereby incorporated by reference into this application.

BACKGROUND OF THE INVENTION

1. Field of the Invention

The present invention relates to a system for determining diverting availability of an object recognition model.

2. Description of the Related Art

Object recognition techniques using machine learning are used in various fields such as product sorting by a robot arm at a logistics distribution site. The object recognition model learns an object and a feature amount indicating a posture thereof, and estimates the position and posture of the object based on the feature amount obtained from an area in a scene image.

One method for efficiently learning an object recognition model is to use simulation. A correct 3D model of the object is required in order to learn properly by the simulation. A method for efficiently generating a 3D model is disclosed in, for example, JP-A-8-233556 (Patent Literature 1).

Patent Literature 1 discloses that "there are an imaging unit 1, a first image storage unit 3 for storing a subject image imaged by the imaging unit 1 from a predetermined viewpoint position, a 3D shape model storage unit 2 for generating a target image imaged from a viewpoint position closest to the imaged subject image based on a standard 3D shape model, a second image storage unit 4 for storing the generated target image, a difference extraction unit 5 for extracting the differences between the subject image and the target image stored in separate image storage unit, and a shape model modification unit for modifying the standard 3D shape model based on an extracted differences. The shape model of the subject is restored by modifying the standard 3D shape model, which is a typical shape model of the subject, based on the differences between the subject image and the target image." (See abstract).

A recognition model of a new object can be efficiently generated by transfer learning of a trained recognition model of another object with a small amount of learning data and learning processing. However, in order to reconstruct the recognition model of the new object by transfer learning, it is important to select an appropriate trained recognition model.

Further, when the learning of an object recognition model is performed by the simulation, a new object model can be efficiently generated by modifying an existing object model as in the technique described in Patent Literature 1. However, in order to accurately and efficiently generate a new object model based on an existing object model, from the viewpoint of recognition by the recognition model, it is important to select a model of an existing object which is similar to the new object and appropriately reflect information on the differences between the new object model and the existing object model in the existing object model.

SUMMARY OF THE INVENTION

In order to solve the above problems, one aspect of the invention adopts the following configuration.

A system includes one or more processors and one or more storage devices. The one or more storage devices store an image time series including a target object, and a trained object recognition model for one or more objects which are different from the target object. The one or more processors acquire a movement trajectory of the target object from a recognition result of the target object in the image time series by the object recognition model, and determine diverting availability of the object recognition model to the target object based on the movement trajectory of the target object.

According to one aspect of the invention, it is possible to determine diverting availability of a trained recognition model of an object with respect to a target object. Problems, configurations, and effects other than those described above will be apparent from the following description of embodiments.

DESCRIPTION OF THE PREFERRED EMBODIMENTS

Figure 1:
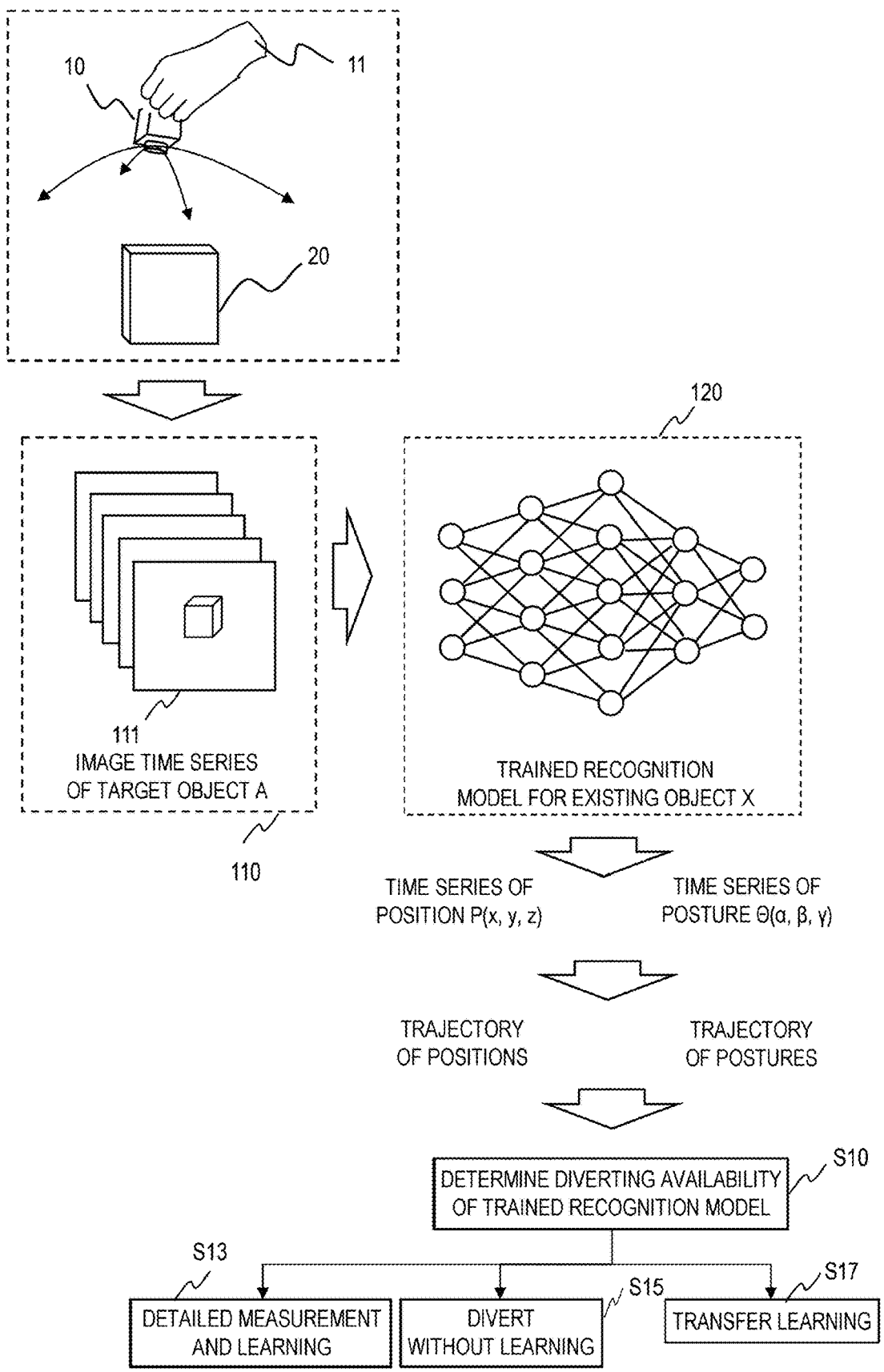
FIG. 1 illustrates an outline of an operation of a system according to an embodiment.

Hereinafter, an embodiment of the invention will be described in detail with reference to the drawings. In the following explanation, same components are denoted by same reference numerals in principle, and a repetitive description thereof is omitted. It should be noted that the embodiment explained below is merely an example for implementing the invention, and does not limit the technical scope of the invention.

FIG. 1 illustrates an outline of an operation of a system according to an embodiment. The system generates a recognition model (artificial intelligence (AI) model) of a target object A by diverting a trained recognition model of another object X, or by training an untrained recognition model for the target object A. The system diverts (including generates) the trained recognition model as it is, or generates the recognition model of the target object A by transfer learning of the trained recognition model. The recognition model can be used in various fields, and can be applied to, for example, product sorting by a robot at a logistics distribution site.

The system determines whether diverting of the trained recognition model of another object X is available for the target object. The system inputs the image time series of the target object A into a trained object recognition model of the other existing object X, and acquires a movement trajectory of the target object A in the image time series. The trajectory is a relative movement trajectory of the target object A as seen from an imaged sensor. The system determines diverting availability of the trained object recognition model to the recognition of the target object A based on the movement trajectory of the object A.

In this way, it is possible to appropriately determine diverting availability of the trained recognition model of another object based on the image time series of the target object by referring to the movement trajectory of the target object in the image time series. In the image time series of the target object, it is possible to take any movement trajectory of the target object. Therefore, the image time series to be determined can be easily acquired.

As shown in FIG. 1, for example, a user holds a camera 10 which is a sensor by a hand 11 and moves the camera 10 to image a target object A20 from various angles. Accordingly, an image time series 110 of the target object A20 can be acquired. As described above, the image time series of the target object can be easily acquired in the system. It should be noted that, in order to acquire the image time series, a plurality of fixed sensors, a robot arm, a turntable, or other mechanisms may be used.

The image time series 110 includes frame images 111 having a predetermined frame rate. In the image time series 110, the position and posture (orientation) of the target object A20 continuously change. It should be noted that the sensor that generates the image is not limited to the camera, and it is possible to use any sensor used in the operating environment in which the object recognition model is used.

The image time series 110 is input to a trained recognition model 120 for the existing object X. The recognition model 120 estimates a position P and a posture θ of the object X in one image of the input object X. In this example, the recognition model 120 is trained to identify merely the object X and estimate the position and posture thereof. In another example, the recognition model may identify a plurality of objects and estimate the positions and postures thereof.

The system acquires the trajectory of the positions and the trajectory of the postures based on the recognition result of the target object A in the image time series 110 by the trained recognition model 120. The trajectory of the positions, the trajectory of the postures, and a combination of the trajectory of the positions and the trajectory of the postures are the movement trajectory of the object. The system determines whether the diverting of the trained recognition model 120 is available for recognition of the target object A20 based on the trajectory of the positions and the trajectory of the postures (S10). It is possible to efficiently generate the recognition model of the target object A20 by diverting of the trained recognition model 120.

As described later, for example, the system determines diverting availability of the trained recognition model 120 according to a degree of internal consistency in the movement trajectory itself. It is assumed that the movement trajectory shows continuity (consistency) without showing abrupt or irregular changes in the image time series. The more the movement trajectory of the recognition result shows contradictions with respect to the assumed continuity, the less the consistency of the movement is. Alternatively, the system may determine the diverting availability of the trained recognition model 120 according to a degree of consistency of the movement trajectory of the recognition result with respect to a movement trajectory serving as a reference. The more the movement trajectory shows differences from the movement trajectory serving as the reference, the less the consistency of the movement trajectory of the recognition result is.

In the example of FIG. 1, when it is determined that the diverting of the trained recognition model 120 is unavailable, the system executes detailed measurement and new learning of the target object A20 (S13). The detailed measurement generates a 3D model of the target object A20 by, for example, a three-dimensional (3D) laser distance sensor. The 3D model can illustrate a shape of an object by using vertices and meshes (surfaces). The system generates learning data by the simulation with the 3D model, and generates an object recognition model by the new learning.

When the diverting of the trained recognition model 120 is available and the consistency of the movement trajectory exceeds a threshold value, the system uses the trained recognition model 120 as it is for recognizing the target object A20 (S15).

When the diverting of the trained recognition model 120 is unavailable and the consistency of the movement trajectory is equal to or less than the threshold value, the system performs transfer learning of the trained recognition model 120 (S17). The system generates an object model of the target object A20 by modifying the object model of the existing object X for the transfer learning. Accordingly, it is possible to efficiently generate the object model of the target object A20. The method for modifying the existing object model will be described later. The object model contains data on the shape of the object and may also contain color information.

Figure 2:
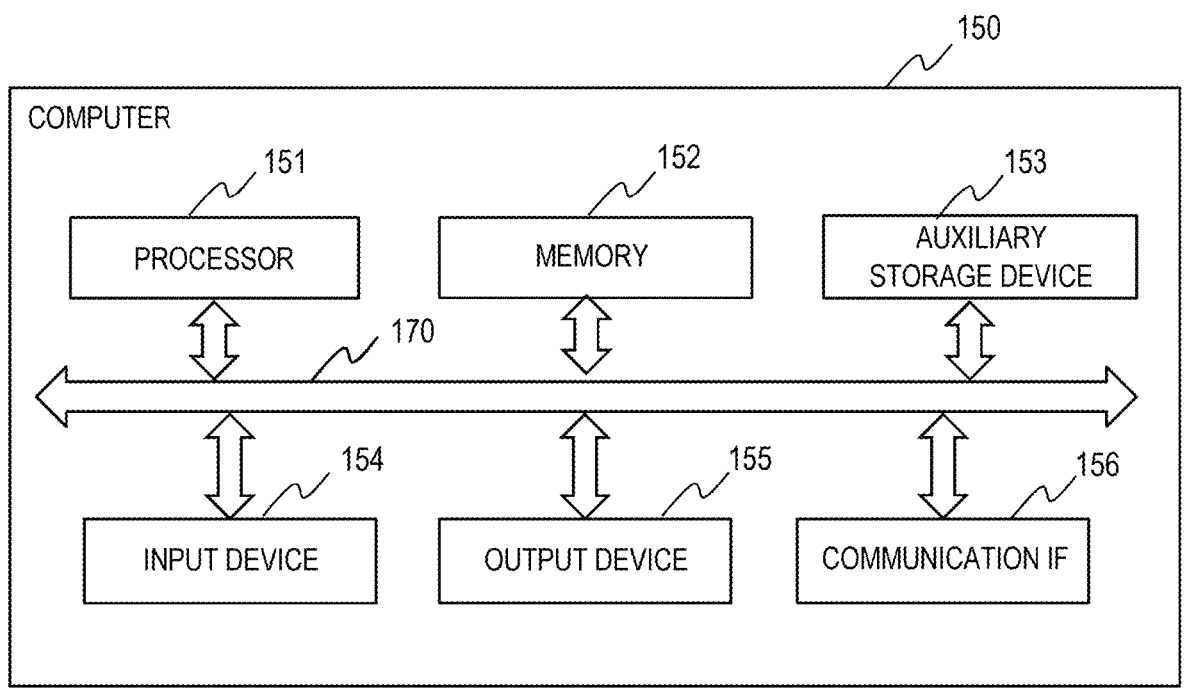
FIG. 2 is a block diagram illustrating a hardware configuration example of a computer included in the system according to the embodiment.

Hereinafter, configuration and operation of the system according to the present embodiment will be described more specifically. FIG. 2 is a block diagram illustrating a hardware configuration example of a computer 150 included in the system according to the embodiment. It is possible to execute the processing described with reference to FIG. 1 by one computer or a plurality of computers connected via network.

The computer 150 is, for example, a computer including a processor 151, a memory 152, an auxiliary storage device 153, an input device 154, an output device 155, and a communication interface (communication IF) 156 that are connected by an internal communication line 157 such as a bus.

The processor 151 executes a program stored in the memory 152. The memory 152 is a storage device and includes a read only memory (ROM) which is a non-volatile storage element and a random access memory (RAM) which is a volatile storage element. The ROM stores an invariant program (for example, basic input/output system (BIOS)) and the like. The RAM is a high-speed and volatile storage element such as a dynamic random access memory (DRAM), and temporarily stores a program to be executed by the processor 151 and the data used when the program is executed.

The auxiliary storage device 153 is a non-volatile storage device with a large-capacity such as a magnetic storage device (hard disk drive (HDD) or solid state drive (SSD), and stores the program to be executed by the processor 151 and the data used when the program is executed. That is, the program is read out from the auxiliary storage device 153, loaded into the memory 152 and executed by the processor 151.

The input device 154 is a device such as a keyboard or a mouse that receives the input from the user. The output device 155 is a device such as a display device or a printer that outputs a program execution result in a format that can be visually recognized by an operator. The communication IF 156 is a network interface device that controls communication with other devices in accordance with a predetermined protocol.

The program to be executed by the processor 151 is provided to the computer 150 via a removable medium (CD-ROM, flash memory, and the like) or network, and is stored in the auxiliary storage device 153 including a non-transient storage medium. Therefore, the computer 150 may have an interface for reading out data from the removable media.

The system according to the embodiment may include one physical computer or a plurality of logically or physically configured computers including one or more processors and one or more storage devices. Separate threads may run on the same computer, and virtual computers built on a plurality of physical computer resources may run on the same computer.

The processor 151 can operate as various functional units in the system described later by operating according to the program loaded in the memory 152. It should be noted that some or all of functions of the functional units included in the processor 151 may be implemented by hardware such as an application specific integrated circuit (ASIC) or a field-programmable gate array (FPGA).

The auxiliary storage device 153 holds, for example, image data 131 and model data 132 described above. A part or all of the information stored in the auxiliary storage device 153 may be stored in the memory 152 or may be stored in an external database or the like connected to the computer 150.

In the present embodiment, the information to be used by the computer 150 may be represented by any data structure regardless of the data structure. Information is represented in a table format in the present embodiment, for example, a data structure body appropriately selected from a list, a database, or a queue can store information.

Figure 3:
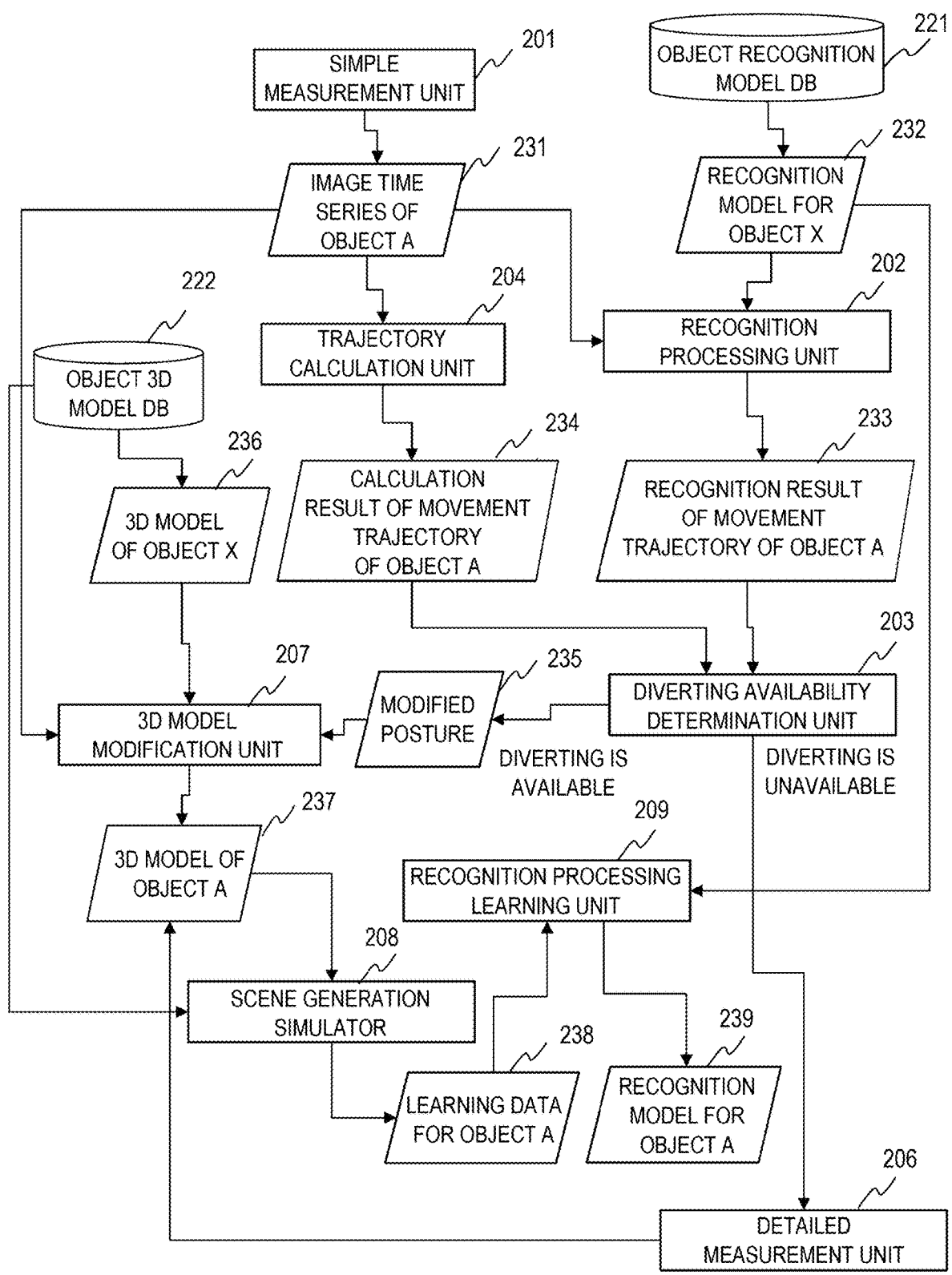
FIG. 3 is a block diagram illustrating an example of a function configuration of the system according to the embodiment.

FIG. 3 is a block diagram illustrating an example of a function configuration of the system according to the embodiment. Hereinafter, a recognition model of a three-dimensional object will be described. The recognition target is not limited to a three-dimensional shape of the object, but may be a two-dimensional shape, a pattern, or a shape with a pattern.

The system includes a simple measurement unit 201, a recognition processing unit 202, a diverting availability determination unit 203, a trajectory calculation unit 204, a detailed measurement unit 206, a 3D model modification unit 207, a scene generation simulator 208, and a recognition processing learning unit 209. These represent a program or a processor 151 that executes the program. The system further includes an object recognition model database 221 and an object 3D model database 222.

These functional units and databases may be distributed and implemented in one computer or a plurality of computers. For example, the databases 221 and 222 may be distributed and stored in the auxiliary storage device 153 of one computer or the auxiliary storage devices 153 of a plurality of computers. The databases and the functional units may be implemented on different computers.

The simple measurement unit 201 takes images of the target object A by a sensor which is not shown in FIG. 3 (see FIG. 1), and acquires image time series 231. The recognition processing unit 202 uses the trained recognition model 232 of the existing object X from the object recognition model database 221 to acquire a movement trajectory 233 of the target object A in the image time series 231. The object recognition model database 221 stores trained recognition models of various objects.

The diverting availability determination unit 203 determines whether the diverting of the trained recognition model 232 of the existing object is available for the recognition of the target object A. The trajectory calculation unit 204 calculates the movement trajectory of the target object A from the image time series 231 and outputs a result 234. The detailed measurement unit 206 measures the target object A by, for example, a 3D laser distance sensor (not shown) to generate a 3D model 237 of the target object A.

The 3D model modification unit 207 modifies the 3D model (object model) of the existing object X extracted (copied) from the object 3D model database 222 to generate the 3D model 237 of the target object A. The object 3D model database 222 stores 3D models of various objects. The registered objects are the same as those in the object recognition model database 221. The 3D model modification unit 207 modifies the 3D model of the existing object X based on the modified posture information 235 acquired from the diverting availability determination unit 203. The modified posture information includes the posture (orientation) to be modified in the 3D model of the existing object X and the image of the target object A20 of the posture.

The scene generation simulator 208 uses the 3D model 237 of the target object A and the 3D model of another object stored in the object 3D model database 222 to execute a simulation and generate learning data 238 for recognition of the target object A. The recognition processing learning unit 209 learns (trains) the trained recognition model 232 of the existing object X by using the learning data 238 for the recognition of the target object A, and generates a recognition model 239 of the target object A.

Figure 4:
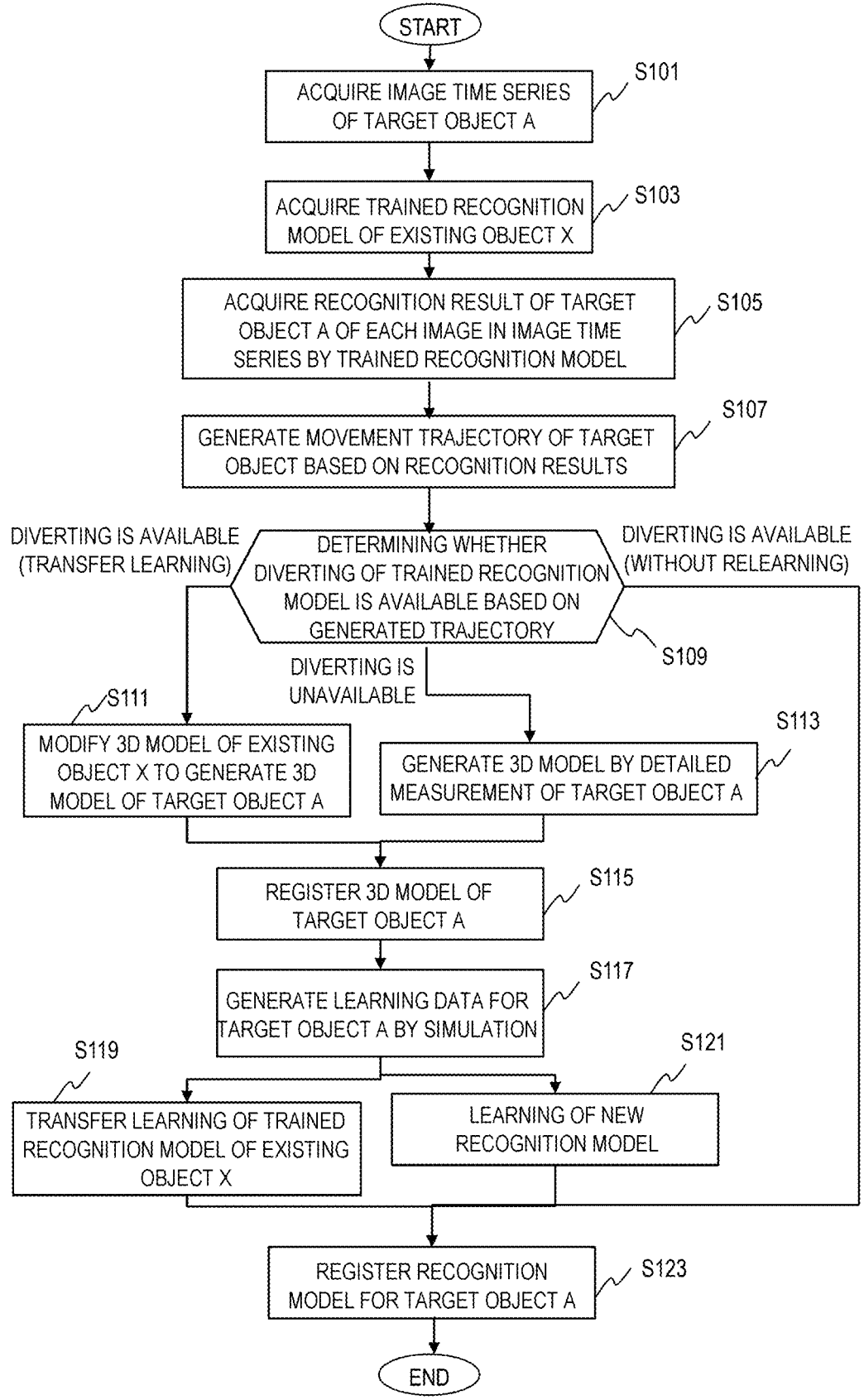
FIG. 4 illustrates a flowchart of an outline of an operation of the system according to the embodiment shown in FIG. 3.

FIG. 4 illustrates a flowchart of an outline of an operation of the system according to the embodiment shown in FIG. 3. In step S101, the simple measurement unit 201 takes images of the target object A by the sensor and acquires the image time series 231. The image time series 231 is stored in, for example, the memory 152.

In step S103, the recognition processing unit 202 acquires the trained recognition model 232 of the existing object X from the object recognition model database 221. The trained recognition model to be selected may be set in the system as a reference model or specified by the user, for example. When the existing object X is similar to the target object A, there is a high possibility that the recognition model of the target object A can be generated more efficiently.

In step S105, the recognition processing unit 202 sequentially inputs the images of the image time series 231 into the trained recognition model 232, and acquires the recognition result of the target object A of each image in the image time series 231 by the trained recognition model 232. The recognition result in the input images of the trained recognition model 232 indicates the position and/or posture of the target object A.

In step S107, the recognition processing unit 202 generates a movement trajectory (a trajectory of positions and/or postures) of the target object Abased on the recognition results of the target object A in the image time series 231 by the trained recognition model 232.

In step S109, the diverting availability determination unit 203 determines whether diverting of the trained recognition model 232 is available for the recognition of the target object A based on the generated movement trajectory. As will be described later, for example, the diverting availability determination unit 203 may determine whether the diverting of the trained recognition model 232 is available based on the internal consistency (continuity) in the movement trajectory of the recognition results of the trained recognition model 232 instead of referring to the movement trajectory calculated without using the trained recognition model 232.

In another example, the diverting availability determination unit 203 may refer to the movement trajectory of the target object A calculated based on the image time series 231 by the trajectory calculation unit 204. The diverting availability determination unit 203 determines whether the diverting of the trained recognition model 232 is available based on a comparison result between the calculated movement trajectory and the movement trajectory of the recognition result of the trained recognition model 232.

In step S109, when it is determined that the diverting of the trained recognition model 232 is available as it is without relearning, the diverting availability determination unit 203 registers the (copy of) trained recognition model 232 of the existing object X in the object recognition model database 221 as a recognition model for the target object A.

When it is determined in step S109 that the diverting of the trained recognition model 232 is available but transfer learning of the trained model 232 is necessary, the 3D model modification unit 207 modifies the 3D model 236 of the existing object X to generate the 3D model 237 of the target object A in step S111. The 3D model modification unit 207 acquires the 3D model 236 of the existing object X from the object 3D model database 222.

The 3D model modification unit 207 further acquires the modified posture information 235 from the diverting availability determination unit 203. The modified posture information 235 includes a posture (orientation) to be modified for the 3D model of the target object A in the 3D model 236 of the existing object X, and an image of the orientation in the image time series 231. The 3D model modification unit 207 modifies (a copy of) the 3D model 236 of the existing object X based on the modified posture information 235. In step S115, the 3D model modification unit 207 registers the 3D model 237 of the target object A generated as a result of the modification in the object 3D model database 222.

When it is determined in step S109 that the trained recognition model 232 cannot be diverted, the detailed measurement unit 206 performs detailed measurement of the target object A by using, for example, the 3D laser distance sensor, and generates a 3D model 237 thereof in step S113. In step S115, the detailed measurement unit 206 registers the generated 3D model 237 of the target object A in the object 3D model database 222.

In step S117, the scene generation simulator 208 generates the learning data for the target object A by simulation. For example, the scene generation simulator 208 performs a physical simulation and generates the learning data according to a mode in which the recognition model is used in actual applications. For example, the recognition model is used in a robot for picking bulk parts. The scene generation simulator 208 uses a 3D model of one or more objects including the target object A to generate a combination of images in which the objects are arranged in various modes in the container and correct recognition results of these images.

When it is determined in step S109 that the diverting of the trained recognition model 232 is available but the transfer learning of the trained recognition model 232 is necessary, the recognition processing learning unit 209 executes the transfer learning of the trained recognition model 232 of the existing object X in step S119. Accordingly, the recognition model 239 of the target object A is generated. In step S123, the recognition processing learning unit 209 registers the recognition model 239 in the object recognition model database 221. The recognition processing learning unit 209 trains the trained recognition model 232 based on the learning data of the target object A. At this time, the postures indicated by the modified posture information 235 may be intensively learned.

When it is determined in step S109 that the diverting of the trained recognition model 232 is unavailable, the recognition processing learning unit 209 trains a new (untrained) recognition model with the learning data of the target object A in step S121. Accordingly, the recognition model 239 of the target object A is generated. In step S123, the recognition processing learning unit 209 registers the recognition model 239 in the object recognition model database 221.

The processing in FIG. 4 determines whether the diverting of the trained recognition model of one object is available (S109). The system may determine whether the diverting of the trained recognition models of a plurality of objects is available, and search for a recognition model that can be diverted. The system may select, for example, a recognition model that can be diverted without relearning, or a recognition model with the highest consistency of recognition results of the movement trajectory of the target object.

Figure 5:
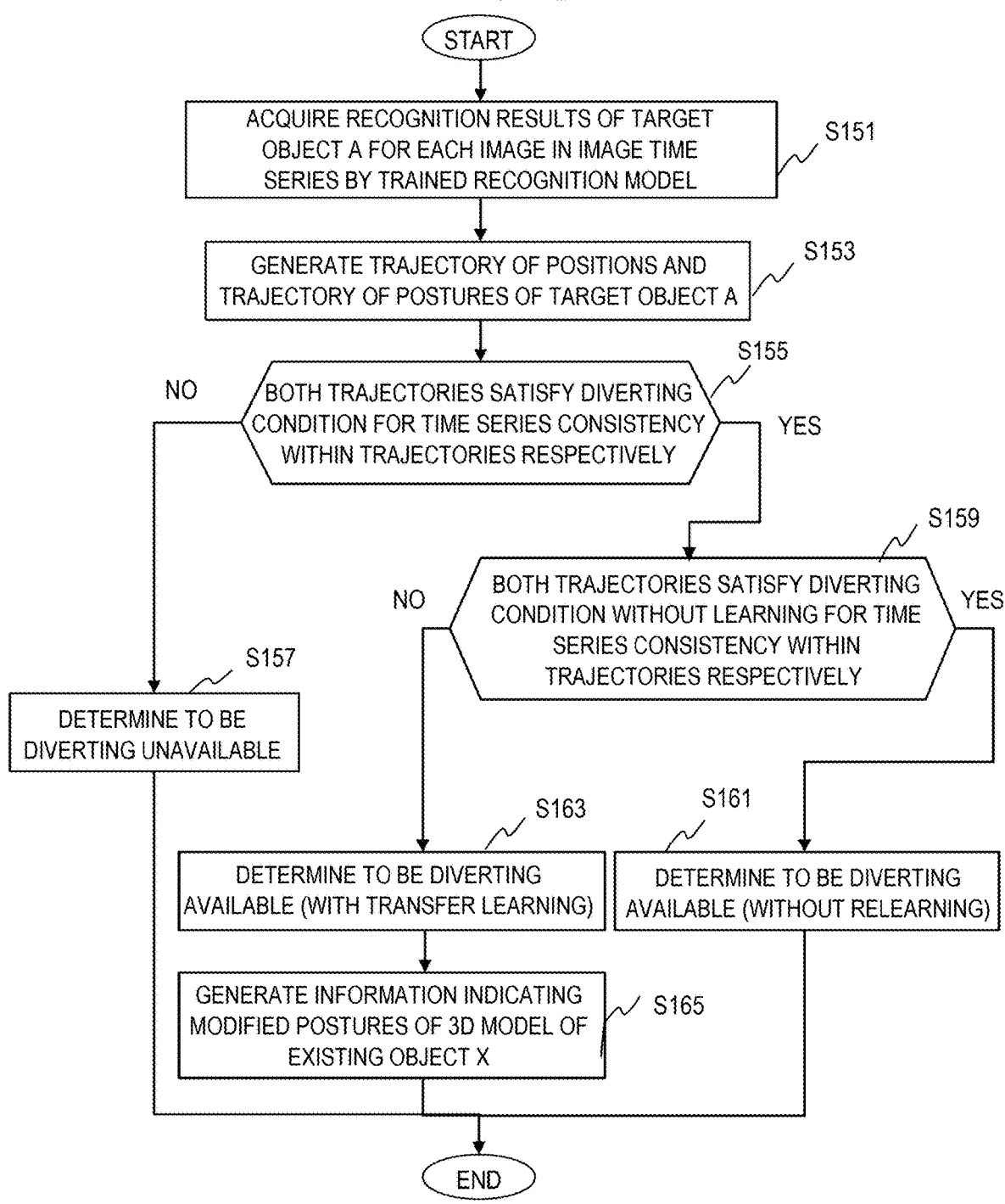
FIG. 5 illustrates a flowchart of an example of a determination method by a diverting availability determination unit.

FIG. 5 illustrates a flowchart of an example of a determination method by the diverting availability determination unit 203. In the example illustrated in FIG. 5, the recognition model recognizes (estimates) the positions and postures of the object. Therefore, the diverting availability determination unit 203 refers to the trajectory of the positions and the trajectory of the postures of the target object A in the image time series. The positions and the postures are represented by three-dimensional coordinates respectively. Further, the diverting availability determination unit 203 determines whether the diverting of the trained recognition model is available based on the shape of the trajectory itself (without referring to other calculation results of the trajectory). Accordingly, it is possible to efficiently determine diverting availability without performing a reference calculation.

With reference to FIG. 5, in step S151, the recognition processing unit 202 sequentially inputs the images in the image time series 231 into the trained recognition model 232, and acquires the recognition result of the target object A of each image in the image time series 231 by the trained recognition model 232. In the present example, the recognition result in the input images of the trained recognition model 232 indicates the position and posture of the target object A.

In step S153, the recognition processing unit 202 generates a trajectory of the positions and a trajectory of the postures of the target object A based on the recognition result of the target object A in the image time series 231 by the trained recognition model 232.

In step S155, the diverting availability determination unit 203 determines whether each of the trajectory of the positions and the trajectory of the postures satisfies a diverting condition (first condition) for the time series consistency within the trajectory. For example, the time series consistency of the trajectory of the positions can be determined based on the velocity of the trajectory, and the time series consistency of the trajectory of the postures can be determined based on the angular velocity (velocity of the angle) of the trajectory. The velocity of the trajectory of the positions is calculated based on a distance between the position coordinates of the objects in the continuous images and a rate of the images (imaging time interval). The velocity of the trajectory of the postures is calculated based on a distance between the posture coordinates of the objects in the continuous images and a rate of the images (imaging time interval).

Figure 6:
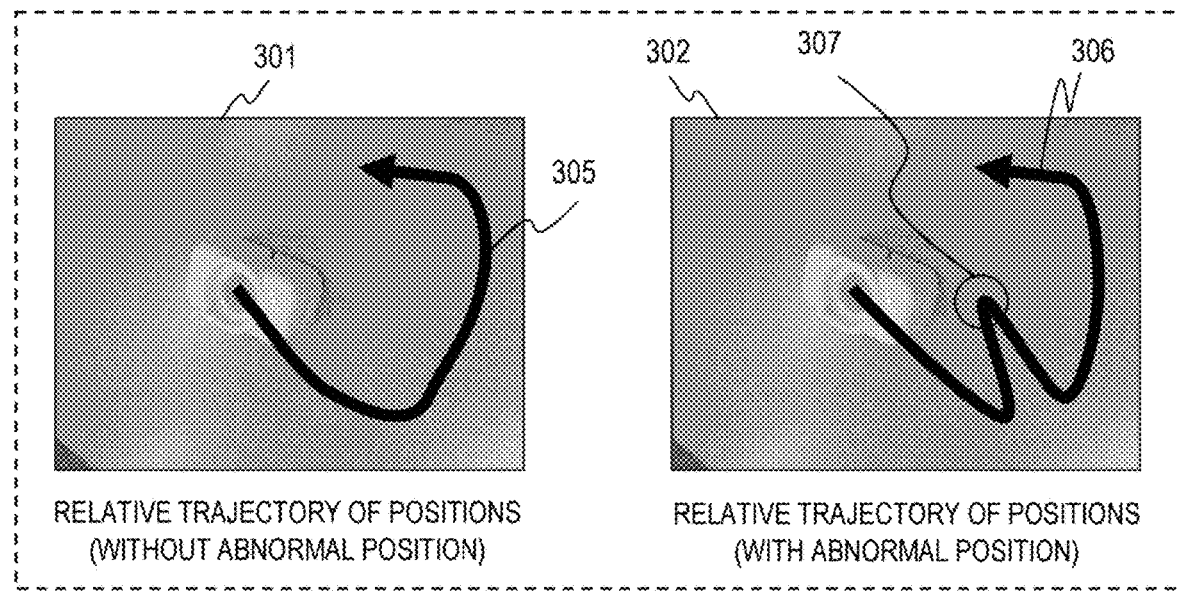
FIG. 6 illustrates an example of a trajectory of positions recognized by a recognition model.

FIG. 6 illustrates an example of a trajectory of recognition positions by a recognition model. FIG. 6 illustrates the trajectory of the positions recognized (estimated) by the arrow in the image. A trajectory 305 of the positions of the target object in an image 301 has a continuous and regular shape, and there is no abnormal position (point) significantly deviated from other adjacent positions (points). On the other hand, a trajectory 306 of the positions in an image 302 includes an abnormal position (point) 307 that is significantly deviated from other adjacent positions. The abnormal position can be estimated as an erroneously recognized position. The trajectory 305 of the positions has higher consistency within the trajectory than that of the time series, and the trajectory 306 of the positions has lower consistency within the trajectory than that of the time series.

Figure 7:
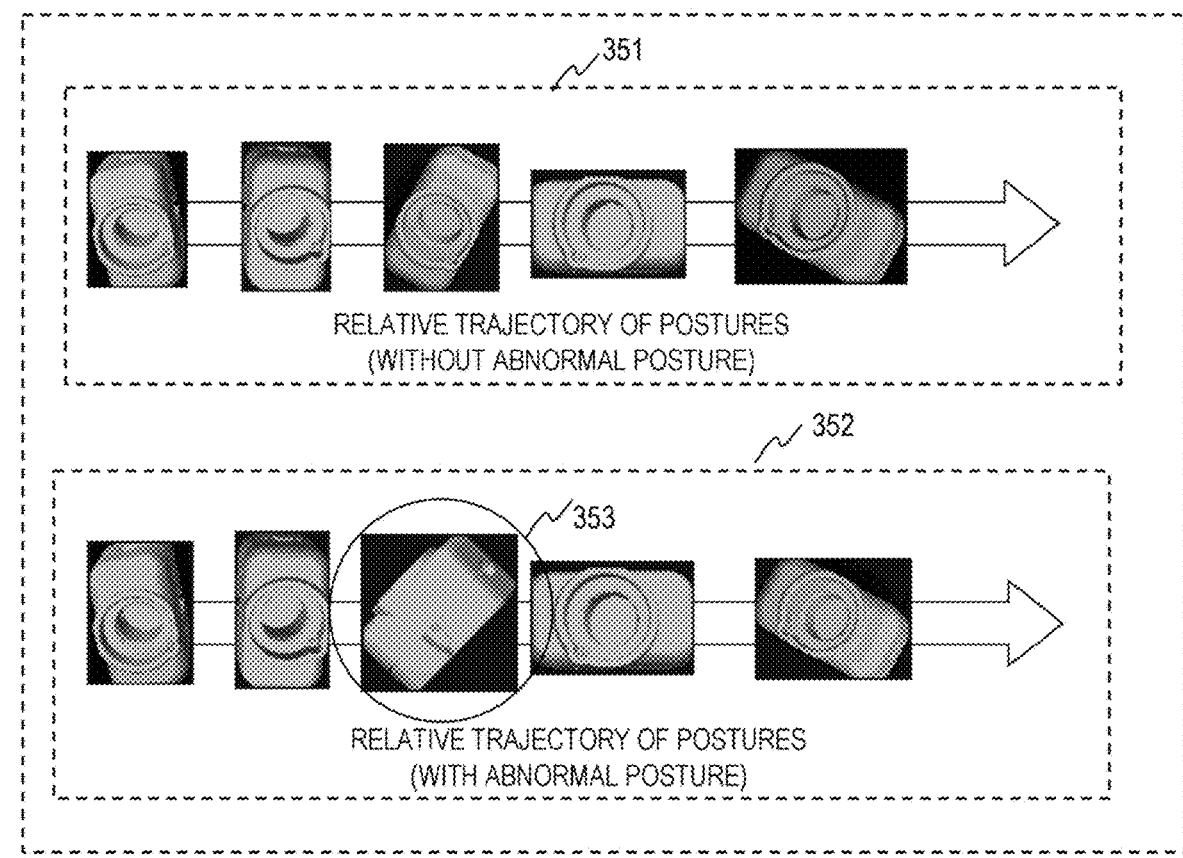
FIG. 7 illustrates an example of a trajectory of postures (vector coordinates) recognized by the recognition model.

FIG. 7 illustrates an example of a trajectory of postures (vector coordinates) recognized by the recognition model. FIG. 7 illustrates the trajectory of the postures recognized (estimated) using the image time series. A trajectory of the postures of the target object illustrated in the image time series 351 has a continuous and regular shape, and there is no abnormal posture significantly deviated from other adjacent postures. On the other hand, a trajectory of the postures illustrated in the image time series 352 includes an abnormal posture 353 that is significantly deviated from other adjacent postures. The abnormal posture can be estimated as an erroneously recognized posture. The trajectory of the postures illustrated in the image time series 351 has higher (internal) consistency within the trajectory than that of the time series, and the trajectory of the postures illustrated in the image time series 352 has lower (internal) consistency within the trajectory than that of the time series.

It is possible to assume a range of possibilities of the sensor trajectory (trajectories having consistency) in imaging the target object according to a moving method of the sensor (for example, movement by the hand of the user). For example, it is possible to assume the maximum value of the speed of the sensor (velocity of position change or velocity of posture change). The maximum value of the speed can change depending on the orientation of velocity. There may be conditions set based on the assumed range of possible velocities of the sensor.

Based on the set conditions, the diverting availability determination unit 203 can determine the diverting availability of the recognition model, and the reconstruction by the transfer learning or the diverting without relearning. The condition for the diverting without relearning is stricter than the condition (consistency required) for the diverting of the recognition model.

The system may have set conditions for, for example, the velocity of the trajectory of the positions and the velocity of the trajectory of the postures. The diverting availability determination unit 203 identifies an abnormal position and an abnormal posture in the trajectory of the positions and the trajectory of the postures respectively according to the above conditions. The diverting availability determination unit 203 can determine a consistency level based on, for example, the number of abnormal positions and abnormal postures.

It is possible to determine the diverting availability of the recognition model and the applicability of the transfer learning depending on the consistency level. For example, the diverting availability determination unit 203 compares the maximum value of the number (or ratio) of abnormal points in the trajectory of the positions and the trajectory of the postures with a predetermined threshold value for determining the diverting availability, and determines that the recognition model is diverted when the number (or ratio) of the abnormal points is less than the threshold value. Furthermore, when the number (or ratio) of the abnormal points is smaller than a predetermined second threshold value which is smaller than the above threshold value, the diverting availability determination unit 203 determines that the recognition model is diverted as it is without relearning (transfer learning).

Referring back to FIG. 5, in step S155, when at least one of the trajectory of the positions and the trajectory of the postures does not satisfy the diverting condition for the time series consistency within the trajectory (S155: NO), the diverting availability determination unit 203 proceeds to step S157. The diverting availability determination unit 203 determines that the condition for diverting the trained recognition model to the recognition of the target object A is not satisfied. Accordingly, the erroneously recognized image can be extracted more reliably.

In step S155, when each of the trajectory of the positions and the trajectory of the postures satisfies the diverting condition for the time series consistency within the trajectory (S155: YES), the diverting availability determination unit 203 proceeds to step S159. In step S159, the diverting availability determination unit 203 determines whether each of the trajectory of the positions and the trajectory of the postures satisfies a diverting condition without learning (second condition) for the time series consistency within the trajectory. The diverting condition without learning is a condition stricter than the diverting condition in step S155.

When each of the trajectory of the positions and the trajectory of the postures satisfies the diverting conditions without learning (S159: YES), the diverting availability determination unit 203 determines in step S161 that the trained recognition model is diverted without learning. When at least one of the trajectory of the positions and the trajectory of the postures does not satisfy the diverting condition without learning (S159: NO), the diverting availability determination unit 203 determines in step S163 to execute the transfer learning of the trained recognition model.

Furthermore, in step S165, the diverting availability determination unit 203 generates information indicating the modified postures of the 3D model of the existing object X. The diverting availability determination unit 203 identifies an image illustrating an abnormal position or an abnormal posture, and estimates the posture of the target object A in the image. The diverting availability determination unit 203 can estimate (for example, an intermediate value) from the recognized posture in the adjacent images of the image illustrating the abnormal position or the abnormal posture (of the erroneously recognized image). The diverting availability determination unit 203 outputs information including the abnormal image and a value of the estimated posture.

The information indicating the modified posture of the 3D model of the existing object X may indicate whether the abnormal image is recognized as abnormal (or erroneously recognized) in the trajectory of the positions or the trajectory of the postures. When the trained recognition model 232 includes, for example, a module for estimating the position of an object and a module for estimating the posture of the object, the recognition processing learning unit 209 may execute the training (learning) of merely one of the positions and the postures or both the positions and the postures according to the determination results of the trajectory of the positions and the trajectory of the postures. Accordingly, the learning of the recognition model can be executed efficiently.

Figure 8:
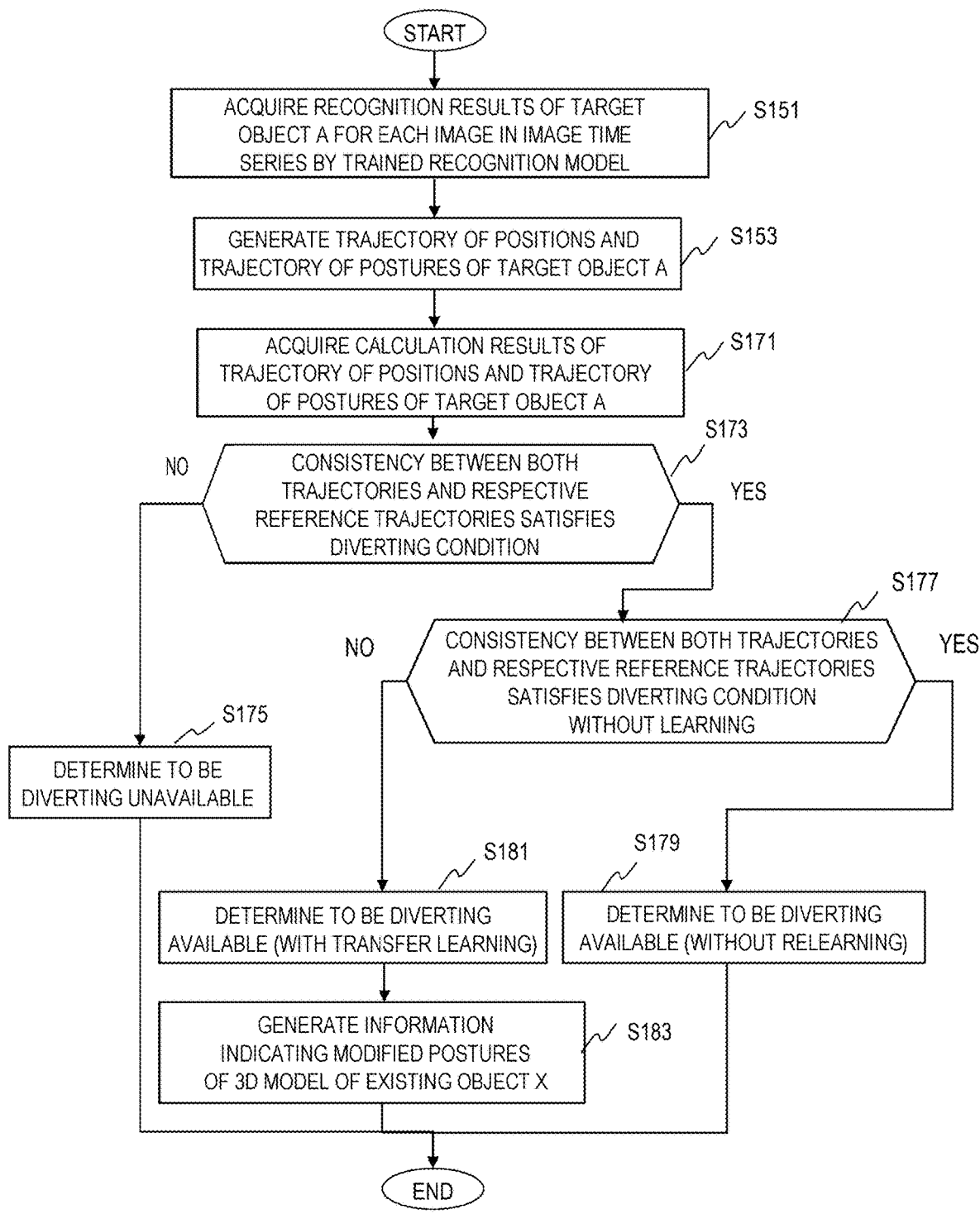
FIG. 8 illustrates a flowchart of another example of the determination method by the diverting availability determination unit.

FIG. 8 illustrates a flowchart of another example of the determination method by the diverting availability determination unit 203. In the example illustrated in FIG. 8, the diverting availability determination unit 203 determines diverting availability of the trained recognition model of another object by referring to the movement trajectory of the image in the image time series acquired by a method different from the recognition model. Accordingly, the determination can be performed more accurately.

The method for calculating the movement trajectory by a method different from the recognition model is not particularly limited, and it is possible to use a technique of restoring a three-dimensional shape from a time series of an image which is two-dimensional data. For example, visual simultaneous localization and mapping (Visual SLAM) or structure from motion (SfM) can be used. Accordingly, it is not necessary to include a reference object as described later in the image.

In the flowchart of FIG. 8, steps S151 and S152 are the same as the flowchart illustrated in FIG. 5. In step S171, the diverting availability determination unit 203 acquires the calculation results of the trajectory of the positions and the trajectory of the postures of the target object A from the trajectory calculation unit 204.

In step S173, the diverting availability determination unit 203 compares the calculated trajectory of the positions and the calculated trajectory of the postures with the trajectory of the positions and the trajectory of the postures recognized (estimated) by the trained recognition model. It is determined whether the consistency between the trajectory of the positions and the calculated trajectory of the positions and the consistency between the trajectory of the postures and the calculated trajectory of the postures satisfy the diverting condition.

For example, the diverting availability determination unit 203 matches the calculated trajectories with the recognized trajectories, and then calculates distances between respective points. When a distance exceeds a predetermined threshold value, the diverting availability determination unit 203 determines that the recognition of the image corresponding to the point is incorrect. The diverting availability determination unit 203 can determine the diverting availability of each of the trajectory of the positions and the trajectory of the postures based on, for example, the number or ratio of the erroneously recognized positions and postures. This point is the same as the flowchart of FIG. 5. For example, a diverting available condition may be the number or ratio of erroneously recognized positions and postures being smaller than respective predetermined threshold values.

In step S173, when at least one of the trajectory of the positions and the trajectory of the postures does not satisfy the diverting condition for the time series consistency within the trajectory (S173: NO), the diverting availability determination unit 203 proceeds to step S175. The diverting availability determination unit 203 determines that the condition under which the diverting of the trained recognition model is available to the recognition of the target object A is not satisfied.

In step S173, when the consistency between the trajectory of the positions and the calculated trajectory of the positions and the consistency between the trajectory of the postures and the calculated trajectory of the postures both satisfy the diverting condition (S173: YES), the diverting availability determination unit 203 proceeds to step S177. In step S177, the diverting availability determination unit 203 determines whether consistency between the trajectory of the positions and the calculated trajectory of the positions and consistency between the trajectory of the postures and the calculated trajectory of the postures both satisfy the diverting condition without learning.

The determination method is the same as that in step S159 in the flowchart of FIG. 5. The diverting condition without learning is a condition stricter than the diverting condition in step S173. For example, the number of the erroneously recognized images is compared to a threshold value smaller than the threshold value in step S173.

When each of the trajectory of the positions and the trajectory of the postures satisfies the diverting condition without learning (S177: YES), the diverting availability determination unit 203 determines that the trained recognition model is diverted without learning in step S179. When at least one of the trajectory of the positions and the trajectory of the postures does not satisfy the diverting condition without learning (S177: NO), the diverting availability determination unit 203 determines in step S181 to execute the transfer learning of the trained recognition model.

Furthermore, in step S183, the diverting availability determination unit 203 generates information indicating the modified postures of the 3D model of the existing object X. This step is the same as step S165 in FIG. 5.

The diverting availability determination unit 203 may determine the diverting availability of the recognition model and whether to perform the relearning or not based on two conditions including a condition for the movement trajectory itself of the target object by the recognition model (a condition for internal consistency) and a condition of comparison results between the calculated reference trajectory and the trajectory based on the recognition results by the recognition model (a condition for consistency with the reference trajectory). Accordingly, the diverting determination can be performed more accurately. For example, when the movement trajectory by the recognition model satisfies both the diverting conditions, it is determined that the diverting is available, and when at least one of the trajectories does not satisfy the diverting conditions, it is determined that the diverting is unavailable. The same applies to the determination for the diverting without learning.

In the above example, the movement trajectory of the target object in the image time series is calculated by a method different from the recognition model. In another example, a reference object that is different from the target object may be included in each image in the image time series, and a comparison target (reference trajectory) of the movement trajectory of the recognition result by the recognition model may be generated from the movement trajectory of the reference object in the image time series.

The reference object is, for example, a two-dimensional code. Each image contains one or more two-dimensional codes along with the target object. The position and pattern (shape) of each two-dimensional code are known in advance, and the trajectory calculation unit 204 can calculate the movement of the sensor, that is, the movement of the target object relative to the sensor, based on the images of the two-dimensional code in the image series. Accordingly, it is possible to generate the reference trajectory by efficient calculation.

The method for modifying the 3D model will be described below. In this example, the 3D model modification unit 207 modifies the 3D model of the existing object X by using the image of the target object A recognized by the trained recognition model of the existing object X. Accordingly, it is possible to efficiently generate the 3D model of the target object A.

Figure 9:
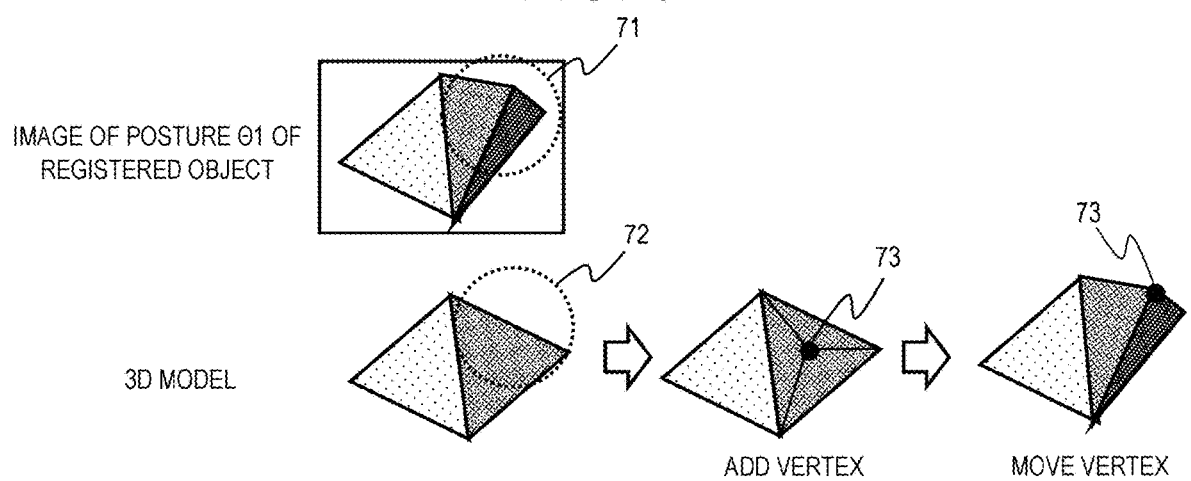
FIG. 9 is an explanatory diagram illustrating an example of a 3D model modification processing.

FIG. 9 is an explanatory diagram illustrating an example of a 3D model modification processing. Hereinafter, an example in which the image of the target object is RGB will be described. In the example of FIG. 9, the 3D model modification unit 207 modifies the 3D model based on an image of a posture θ1 of the target object. A local area 71 of the image of the target object and a local area 72 of the 3D model are compared. The local area 71 includes two surfaces, but the local area 72 includes one surface. Therefore, the 3D model modification unit 207 increases the number of surfaces by adding a vertex 73 to the local area 72 of the 3D model. The 3D model modification unit 207 moves the added vertex 73 to make the local area 72 similar to or match the local area 71.

As described above, in the example of FIG. 9, the 3D model modification unit 207 modifies the different area into a similar or matching area by refining the meshes of the different area in the 3D model. The 3D model modification unit 207 may delete a vertex of the local area 72 and then move other vertices, or may simply move a certain vertex of the local area 72 according to the difference between the local area 72 and the local area 71.

In this way, the 3D model modification unit 207 can generate meshes when refining the meshes of the 3D model, for example, by automatically changing the number of vertices and the topology of the meshes using a neural network.

Further, in a case where the image of the target object is an RGB-Depth image, when refining the meshes of a 3D model, for example, the 3D model modification unit 207 modifies the 3D model by using a neural network to integrate meshes, which are obtained by meshing the imaging point cloud obtained from the image, with the 3D model.

Furthermore, if the image of the reference object is also an RGB-Depth image, when refining the meshes of a 3D model, for example, the 3D model modification unit 207 may modify the 3D model by using a neural network to replace the imaging point cloud obtained from the image of the posture of the reference object corresponding to the 3D model with the imaging point cloud obtained from the image of the target object. When the model of the object is a 2D model, the 2D model of the existing object may be modified to create a 2D model of the target object.

The invention is not limited to the above embodiments, and includes various modifications. For example, the embodiments described above have been described in detail for easy understanding of the invention, and the invention is not necessarily limited to those including all of the configurations described above. A part of a configuration of one embodiment can be replaced with a configuration of another embodiment, and the configuration of another embodiment can be added to the configuration of one embodiment. Further, a part of the configuration of each embodiment can be added to another configuration, omitted, or replaced with another configuration.

Each of the configurations, functions, processing units, processing methods or the like described above may be partially or entirely implemented by hardware such as through design using an integrated circuit. The configurations, functions, and the like described above may be realized by software by a processor interpreting and executing a program for realizing the respective functions. Information such as a program, a table, and a file for realizing each function can be placed in a recording device such as a memory, a hard disk, or a solid state drive (SSD), or in a recording medium such as an IC card, an SD card, or a DVD.

Control lines or information lines indicate what is considered necessary for description, and not all the control lines or information lines are shown in a product. It may be considered that almost all the configurations are actually connected to each other.

What is claimed is:

1. A system comprising:
one or more processors; and
one or more storage devices,
wherein the one or more storage devices are configured to store:
an image time series of a plurality of images of a target object, and
a trained object recognition model for one or more objects which are different from the target object, and
wherein the one or more processors are configured to:
acquire a trajectory of a position and a trajectory of a posture as a movement trajectory of the target object from a recognition result of the target object in the image time series by the object recognition model, the posture indicating an orientation of the target object,
determine whether the trajectory of the position of satisfies a first time series consistency based on a velocity of the trajectory of the position,
determine whether the trajectory of the posture of satisfies a second time series consistency based on an angular velocity of the trajectory of the posture, and
determine, based on whether the first time series consistency and the second time series consistency are satisfied, a diverting availability of the object recognition model to the target object based on the movement trajectory of the target object.

2. The system according to the claim 1,
wherein the one or more processors are configured to:
determine to modify an object model for which the object recognition model is learned to generate an object model of the target object for learning of the object recognition model when the movement trajectory of the target object satisfies the first time series consistency and satisfies the second time series consistency as a first condition and does not satisfy a predetermined second condition that is stricter than the first condition, and
determine to divert the object recognition model for recognition of the target object without the learning of the object recognition model when the movement trajectory of the target object satisfies the second condition.

3. The system according to the claim 2,
wherein the one or more processors are configured to:
identify an image that deviates from a predetermined third condition in the movement trajectory of the target object, and
modify the object model for which the object recognition model is learned using the identified image.

4. The system according to the claim 1,
wherein the one or more processors are configured to:
calculate a trajectory of a position and a trajectory of a posture of the target object from the image time series without using the object recognition model, and
determine the diverting availability of the object recognition model to the target object based on a comparison result between the calculated trajectory of the position and the trajectory of a posture of the target object and the trajectory of the position and the trajectory of the posture movement trajectory of the target object obtained from the recognition result of the object recognition model.

5. The system according to the claim 4,
wherein the one or more processors are configured to restore a three-dimensional shape of the target object from the image time series, and calculate a trajectory of a position and a trajectory of a posture of the target object from movement of the restored three-dimensional shape without using the object recognition model.

6. The system according to the claim 4,
wherein images included in the image time series include images of a reference object together with images of the target object, and
wherein the one or more processors are configured to calculate a movement trajectory of the target object based on a movement trajectory of the reference object in the image time series without using the object recognition model.

7. A method for determining diverting availability of a trained object recognition model to a target object in a system, the method comprising:
acquiring, by the system, a trajectory of a position and a trajectory of a posture of the target object from a recognition result of the target object by the trained object recognition model in an image time series including the target object, the posture indicating an orientation of the target object;
determining whether the trajectory of the position of satisfies a first time series consistency based on a velocity of the trajectory of the position;
determining whether the trajectory of the posture of satisfies a second time series consistency based on an angular velocity of the trajectory of the posture; and
determining, based on whether the first time series consistency and the second time series consistency are satisfied, a diverting availability of the trained object recognition model to the target object based on the movement trajectory of the target object.

* * * * *